(12) United States Patent
Boariu et al.

(10) Patent No.: US 8,386,907 B2
(45) Date of Patent: Feb. 26, 2013

(54) MULTI-USER PACKING TECHNIQUES FOR WIRELESS NETWORK

(75) Inventors: Adrian Boariu, Irving, TX (US); Shashikant Maheshwari, Irving, TX (US); Haihong Zheng, Coppell, TX (US)

(73) Assignee: Nokia Siemens Networks Oy, Espoo (FI)

( * ) Notice: Subject to any disclaimer, the term of this patent is extended or adjusted under 35 U.S.C. 154(b) by 347 days.

(21) Appl. No.: 12/739,086

(22) PCT Filed: Oct. 22, 2008

(86) PCT No.: PCT/US2008/080758
§ 371 (c)(1),
(2), (4) Date: Sep. 13, 2010

(87) PCT Pub. No.: WO2009/055448
PCT Pub. Date: Apr. 30, 2009

(65) Prior Publication Data
US 2011/0010610 A1   Jan. 13, 2011

Related U.S. Application Data

(60) Provisional application No. 60/982,105, filed on Oct. 23, 2007.

(51) Int. Cl.
*G06F 11/00* (2006.01)
(52) U.S. Cl. .................................................. 714/807
(58) Field of Classification Search .................. 714/807
See application file for complete search history.

(56) References Cited

U.S. PATENT DOCUMENTS

| | | | | |
|---|---|---|---|---|
| 2006/0171406 A1* | 8/2006 | Kwon et al. | | 370/419 |
| 2009/0298504 A1* | 12/2009 | Lee et al. | | 455/437 |
| 2011/0243061 A1* | 10/2011 | Wang et al. | | 370/315 |
| 2012/0140722 A1* | 6/2012 | Lim et al. | | 370/329 |

FOREIGN PATENT DOCUMENTS

| | | |
|---|---|---|
| EP | 1 686 729 A1 | 8/2006 |
| WO | WO 2005/112354 A1 | 11/2005 |

OTHER PUBLICATIONS

Tao, Z., et al., "Aggregation and Concatenation in IEEE 802.16j Mobile Multihop Relay (MMR) Networks", © 2007 IEEE, pp. 85-88.
IEEE Standard for Information technology; Telecommunications and information exchange between systems; Local and metropolitan area networks; Specific requirements; Part 11: Wireless LAN Medium Access Control (MAC) and Physical Layer (PHY) Specifications; IEEE Std 802.11™-2007 (Revision of IEEE Std 802.11-1999 ), Jun. 12, 2007.
802.16 IEEE Standard for local and metropolitan aera networks; Part 16: Air interface for fixed broadband wireless access systems; Oct. 1, 2004.

* cited by examiner

*Primary Examiner* — Bryce Bonzo
(74) *Attorney, Agent, or Firm* — Harrington & Smith (57) ABSTRACT

Various example embodiments are disclosed herein. According to an example embodiment, a method may include transmitting a Media Access Control Protocol Data Unit (MAC PDU) via a wireless link to one or more mobile stations, the MAC PDU including a plurality of MAC management messages as a pay load, at least some of the MAC management messages directed to different mobile stations, the KIAC PDU including a MAC header having a connection ID field identifying a connection for all (or at least one, or a plurality) of the MAC management messages included in the MAC PDU.

31 Claims, 8 Drawing Sheets

MULTI-USER PACKING TECHNIQUES FOR WIRELESS NETWORK

PRIORITY CLAIM

This application claims the benefit of priority based on U.S. Provisional Application No. 60/982,105, filed Oct. 23, 2007, entitled, "Multi-User Packing Techniques For Wireless Network," hereby incorporated by reference.

TECHNICAL FIELD

This description relates to wireless networks.

BACKGROUND

In wireless networks, packets or Media Access Control Protocol Data Units (MAC PDUs) typically include a MAC header, a payload (e.g., either data message or management message), and a Cyclic Redundancy Check (CRC) to allow for error detection over the payload or message. The MAC header and CRC add substantial overhead for the MAC PDU. It may be desirable to decrease packet overhead where possible.

SUMMARY

According to an example embodiment, a method may include transmitting a Media Access Control Protocol Data Unit (MAC PDU) via a wireless link to one or more mobile stations, the MAC PDU including a plurality of MAC management messages as a payload, at least some of the MAC management messages directed to different mobile stations, the MAC PDU including a MAC header having a connection ID field identifying a connection for all of the MAC management messages included in the MAC PDU.

According to another example embodiment, a method may include receiving a first range request (RNG-REQ) message via wireless communication from a first mobile station, receiving a second RNG-REQ message via wireless communication from a second mobile station, and transmitting a Media Access Control Protocol Data Unit (MAC PDU) via wireless communication to a plurality of mobile stations, the MAC PDU including a plurality of concatenated range response (RNG-RSP) messages including a first RNG-RSP directed to the first mobile station and a second RNG-RSP message directed to the second mobile station, the MAC PDU also including a MAC header having a connection ID field identifying a common connection ID for the plurality of concatenated RNG-RSP messages.

According to another example embodiment, an apparatus may include: a wireless interface, and a controller. The apparatus may be configured to: receive a first range request (RNG-REQ) message via wireless communication from a first mobile station; receive a second RNG-REQ message via wireless communication from a second mobile station; and transmit a Media Access Control Protocol Data Unit (MAC PDU) via wireless communication to a plurality of mobile stations, the MAC PDU including a plurality of concatenated range response (RNG-RSP) messages including a first RNG-RSP directed to the first mobile station and a second RNG-RSP message directed to the second mobile station, the MAC PDU also including a MAC header having a connection ID field identifying a common connection ID for the plurality of concatenated RNG-RSP messages.

According to another example embodiment, an apparatus may include: a wireless interface (or wireless transceiver), and a controller. The apparatus may be configured to transmit a Media Access Control Protocol Data Unit (MAC PDU) via a wireless link to one or more mobile stations, the MAC PDU including a plurality of MAC management messages as a payload, at least some of the MAC management messages directed to different mobile stations, the MAC PDU including a MAC header having a connection ID field identifying a connection for all of the MAC management messages included in the MAC PDU.

According to another example embodiment, an apparatus may include: a wireless interface, and a controller. The controller may be configured to transmit a Media Access Control Protocol Data Unit (MAC PDU) via a wireless link to one or more mobile stations, the MAC PDU including a plurality of MAC management messages as a payload, at least some of the MAC management messages directed to different mobile stations, the MAC PDU including a MAC header having a connection ID field identifying a connection for at least one of the MAC management messages included in the MAC PDU. Additional sub-headers may be included in the concatenated MAC PDU having a connection ID field identifying a connection for at least one of the MAC management messages.

The details of one or more implementations are set forth in the accompanying drawings and the description below. Other features will be apparent from the description and drawings, and from the claims.

DETAILED DESCRIPTION

Figure 1:
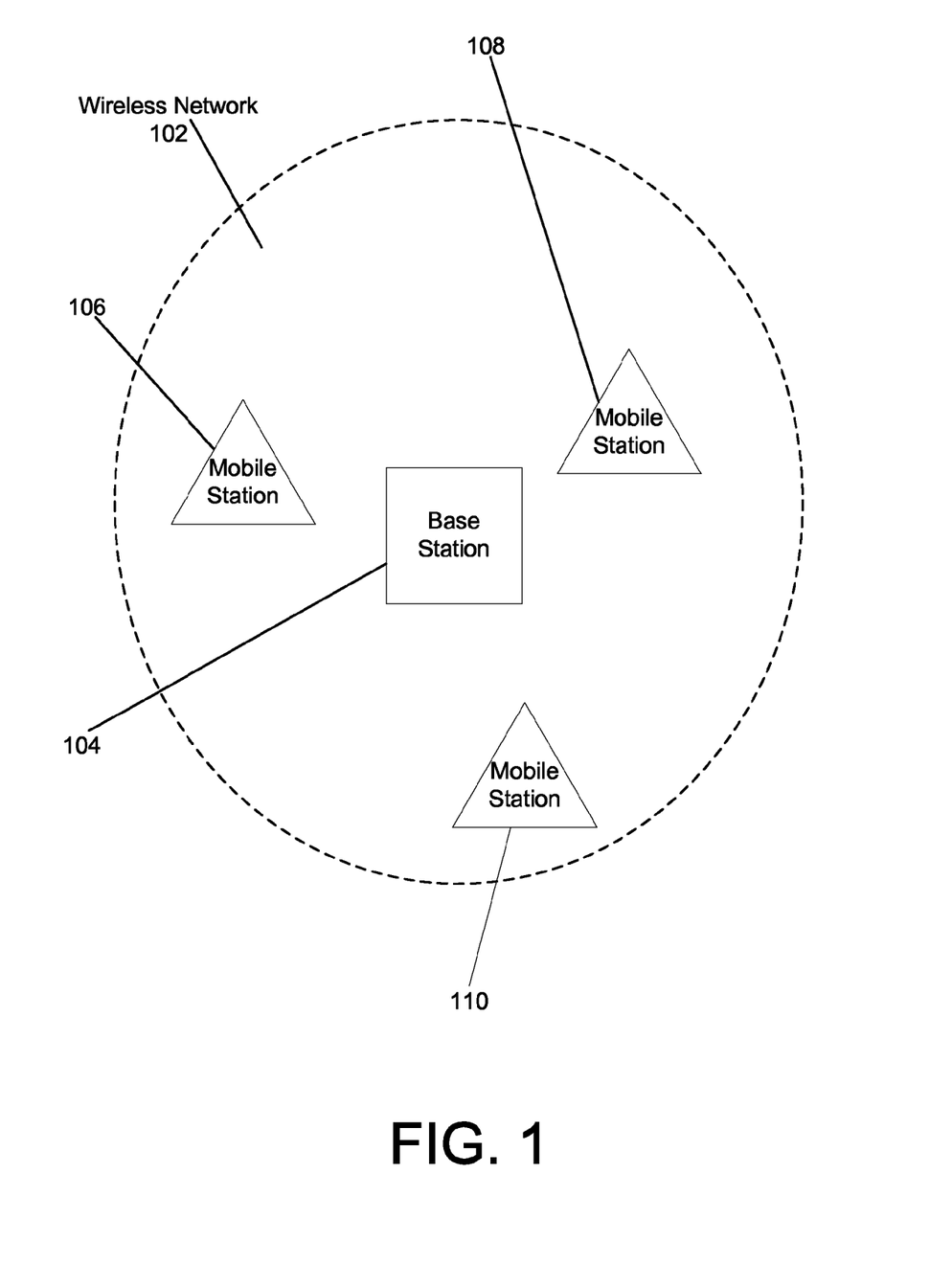
FIG. 1 is a block diagram of a wireless network according to an example embodiment.

FIG. 1 is a block diagram of a wireless network 102 including a base station 104 and three mobile stations 106, 108, 110 according to an example embodiment. Although not shown, mobile stations 106, 108 and 110 may be coupled to base station 104 via relay stations or relay nodes, for example. The wireless network 102 may include, for example, an IEEE 802.16 Wireless Metropolitan Area Network (WiMAX), an IEEE 802.11 Wireless Local Area Network (WLAN), or a cellular telephone network, according to example embodiments. The base station 104 may include a cellular or WiMAX base station (BS), a node B, an 802.11 access point, or other infrastructure node, according to various example embodiments. The term "base station" (BS) may be used herein and may include any type of infrastructure node. The mobile stations 106, 108, 110 may include laptop or notebook computers, smartphones, personal digital assistants (PDAs), cellular telephones, WiMAX device, subscriber station, or any other wireless device, according to example embodiments. The term "wireless node" may include any type of wireless node, such as base stations, mobile stations, etc. While the present disclosure may use some of the terminology of WiMax or other wireless standards, aspects of the present disclosure may be applicable to any networking or wireless technologies.

Figure 2:
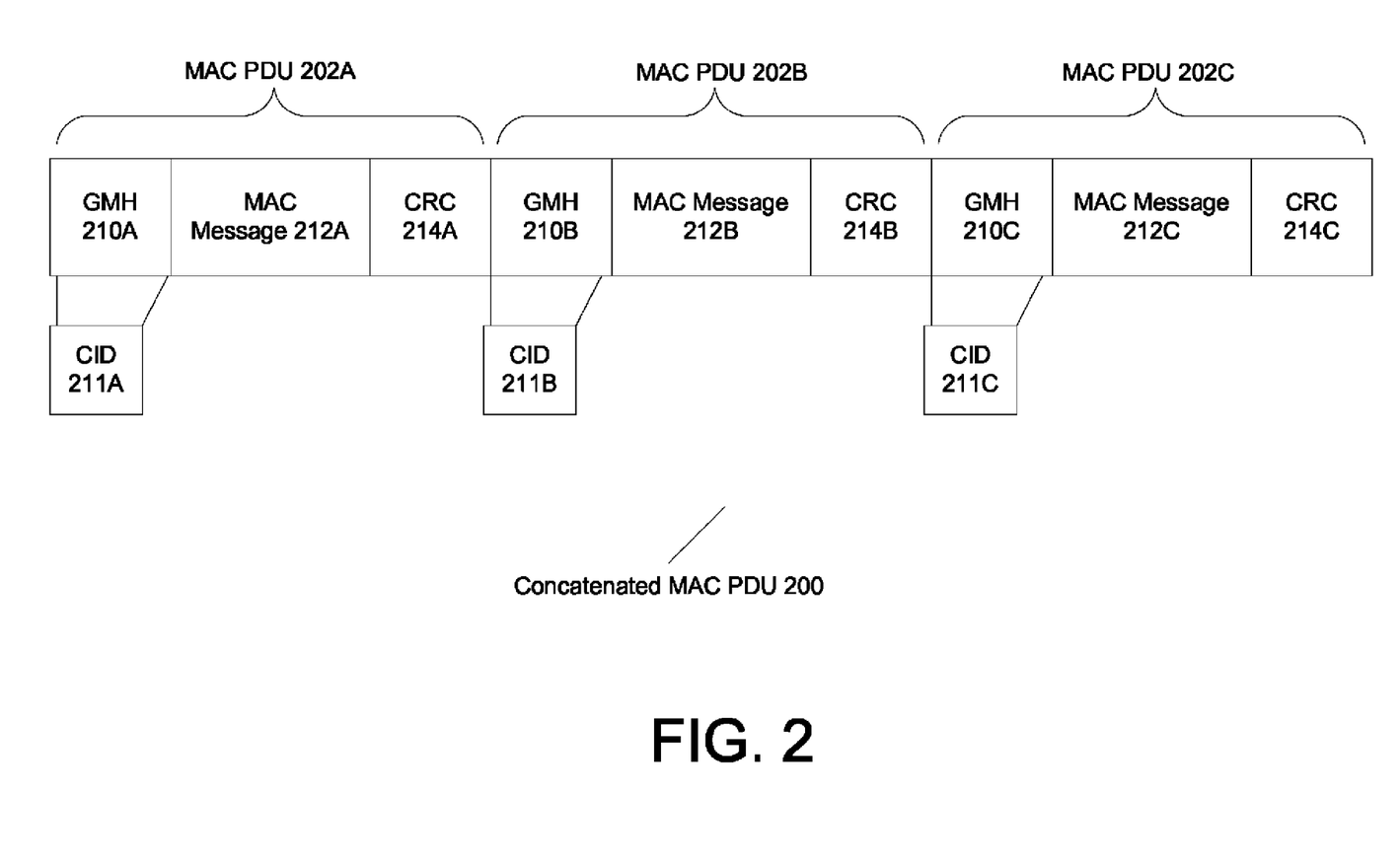
FIG. 2 is a diagram illustrating a physical protocol data unit (PHY PDU) or burst according to an example embodiment.

FIG. 2 is a diagram illustrating a concatenated MAC protocol data unit (MAC PDU) or burst according to an example embodiment. A concatenated MAC PDU 200 may include, for example, a plurality of MAC PDUs (which may be, e.g., MAC management messages or other messages) concatenated together, such as, MAC PDUs 202A, 202B and 202C. Although three PDUs 202 are shown, any number may be concatenated. Each MAC PDU may typically include a MAC (Media Access Control) header 210 (shown as Generic MAC header or GMH 210), a MAC message (such as a MAC management message) 212, and a CRC (Cyclic Redundancy Check) 214. For example, MAC PDU 202A may include a GMH 210A, a MAC message 212A, and a CRC 214A. MAC PDU 202B may include a GMH 210B, a MAC message 212B, and a CRC 212B. Likewise, MAC PDU 202C may include a GMH 210C, a MAC message 212C, and a CRC 212C.

The GMH (or MAC header) 210 for each MAC PDU may include a number of fields, such as, for example, a connection identifier (CID) 211 that identifies or corresponds to a connection between a mobile station and a base station (or other infrastructure node) that the MAC PDU corresponds to. The GMH 210 includes other fields, not shown. For example, GMH 210A may include a CID 211A, GMH 210B may include CID 211B, and GMH 210C may include a CID 211C. In general, the CID for each MAC message 212 may be the same or may be different, e.g., different CIDs for each MAC PDU 202. In the case where a same CID 211 is used for each of the MAC messages 202, the GMH 310 may be considered redundant, at least in some cases.

Thus, according to an example embodiment, where multiple messages include a same (or common) CID, the intermediate GMHs and CRC may be omitted, and the MAC payloads may be concatenated within a single MAC PDU, and share one GMH and possibly one CRC at the end for the concatenated MAC PDU.

Figure 3:
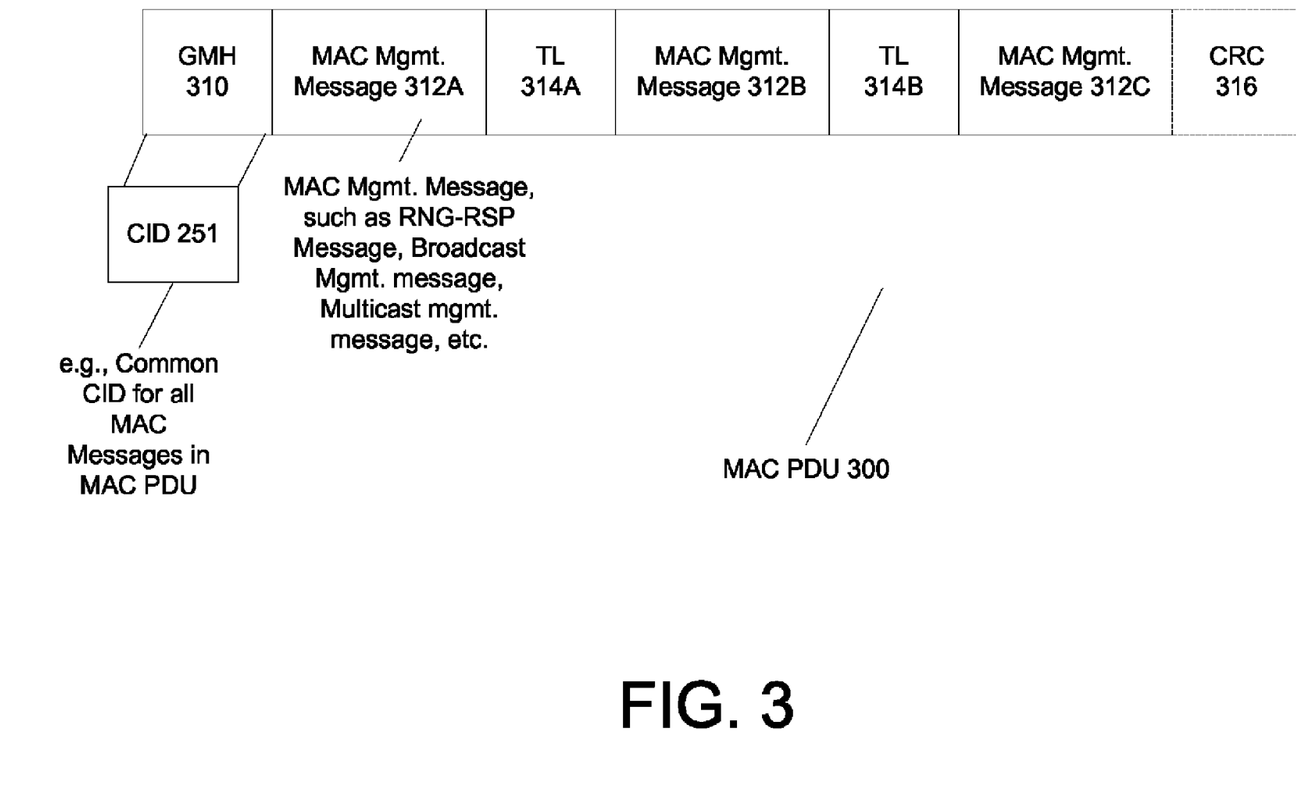
FIG. 3 is a diagram illustrating a format of an example MAC PDU having multiple MAC messages that are concatenated.

FIG. 3 is a diagram illustrating a format of an example MAC PDU having multiple MAC messages that are concatenated. MAC PDU 300 may include multiple MAC Management messages, such as MAC Management Messages 312A, 312B and 312C, for example. These MAC Management messages may have a common CID (or correspond to the same connection identifier or CID). Thus, MAC PDU 300 may include one GMH 310 (or MAC header) that includes one (or a common) CID 251, e.g., for all the MAC management messages 312A, 312B, 312C, . . . within MAC PDU 300.

In an example embodiment, the MAC PDU 300 may also optionally include a type length (TL) field 314 that may identify the type of message and length of the message for one or more of the MAC management messages, such as TL field 314A for MAC management message 3128, TL 314B for MAC management message 314C, etc. For example, if more than one MAC management message 312 is included in the MAC PDU 300, then a TL field 314 may identify type and length of such additional management messages. In another example embodiment, the TL field may provide the information on the CID for which the following MAC management message is assigned, if multiple MAC management messages for different CIDs are concatenated; in this case the TL field is actually a type-value (TV) field. In another example embodiment, the field TL may provide only the type information (T) which indicates that a new MAC management message follows for the previously indicated CID. An optional CRC 316 may also provide for error detection or protection for the entire MAC PDU or for all of the MAC management messages 312 in MAC PDU 300.

The MAC PDU 300 may be used to transmit multiple concatenated MAC messages that correspond to a same (or common) CID (connection identifier), while reducing overhead via a single GMH/CID and possibly a common CRC. Different types of traffic or management messages corresponding to a common CID may be concatenated in this manner. For example, a Ranging CID (e.g., CID=0) may identify Ranging messages, such as for initial, periodic, or handover ranging (e.g., Range Request or RNG-REQ, Range Response or RNG-RSP messages, . . . ). Thus, RNG-RSP messages transmitted by a base station to different mobile stations (e.g., all having CID=0 that indicates Ranging) may be concatenated or grouped into one MAC PDU with a common GMH (including one CID), and optionally a common CRC. In order to provide backward compatibility with legacy terminals, new initial CID (e.g. CID=1) may be assigned to indicate the above mentioned concatenation method.

Traffic or multiple messages for a number of other CIDs may also be grouped or concatenated in one MAC PDU. For example, a basic CID may be assigned for high priority management messages or traffic, such as management messages for handover procedures. A primary CID may be assigned for low priority management messages (e.g., for registration, authentication, . . . ). A broadcast CID (e.g., CID=FFFF) may be assigned to multiple broadcast management messages. For example, a base station may transmit multiple broadcast messages, such as DCD, UCD, MOB-NBR_ADV, as provided by IEEE 802.16 standard, as some examples, one or more of which may be combined into a MAC PDU, if the broadcast messages have a same (or common) CID. A multicast-specific multicast CID may be assigned to multiple multicast management messages, which may allow multiple multicast messages, having a same multicast-CID, to be transmitted in one MAC PDU. These are some examples and other messages for other CIDs may be grouped together or concatenated into one MAC PDU (e.g., which have a common CID).

Figure 4:
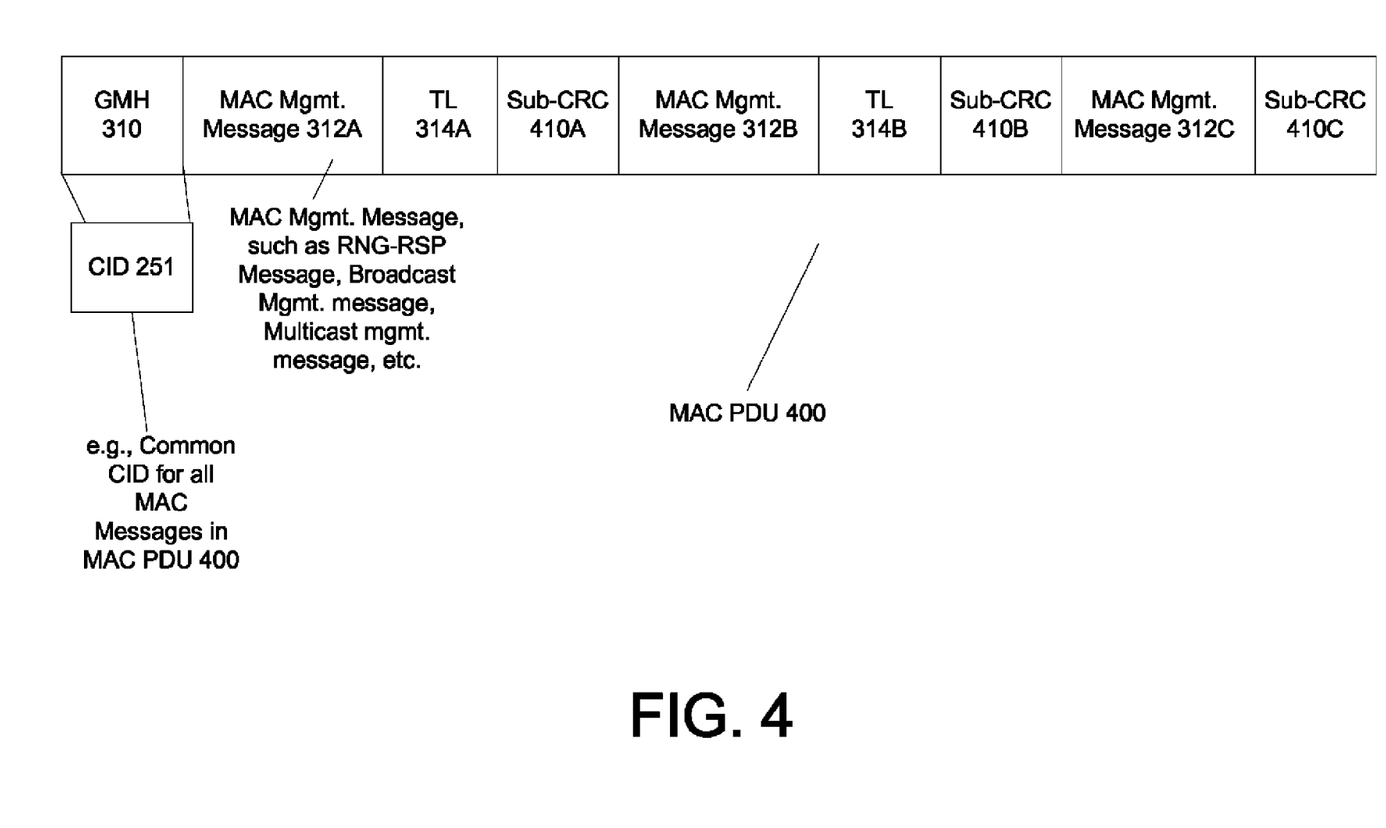
FIG. 4 is a diagram illustrating a format of another example MAC PDU having multiple MAC messages that are concatenated.

FIG. 4 is a diagram illustrating a format of another example MAC PDU having multiple MAC messages that are concatenated. MAC PDU 400 may include a GMH 310 having a CID 251 that may be common to multiple MAC management messages 312A, 312B, 312C, etc. Type Length (TL) field may identify a type and length of the following MAC management message, e.g., if more than one MAC management message 312 is included. In another example embodiment the TL field may provide the information on the CID for which the following MAC management message is assigned, if multiple MAC management messages for different CIDs are concatenated; in this case the TL field is actually a type-value (TV) field. In another example embodiment, the field TL may provide only the type information (T) which indicates that a new MAC management message follows for the previously indicated CID. MAC PDU 400 of FIG. 4 may also include an optional sub-CRC 410 for each (or one or more) of the MAC management messages 312. For example, the CRC 316 for the MAC PDU 300 (FIG. 3) may be used to detect an error in the concatenated MAC PDU. However, an uncorrectable error in one of the MAC management messages may render the entire MAC PDU, including all concatenated MAC management messages as unusable or unrecoverable, and thus all the concatenated messages would be discarded and need to be retransmitted. In an example embodiment, MAC PDU 400 of FIG. 4 may provide a more efficient error detection solution, by providing a sub-CRC 410 for each MAC management message in the MAC PDU 400. The sub-CRC is computed using the MAC management message 312 and TL 314 if present. This may allow errors within each message 312 to be separately detected, and an error in one MAC management message 312 would not necessarily create a problem for another MAC management message within the same MAC PDU 400. In such case, a CRC 316 for the MAC PDU may not be necessary, for example.

Figure 5:
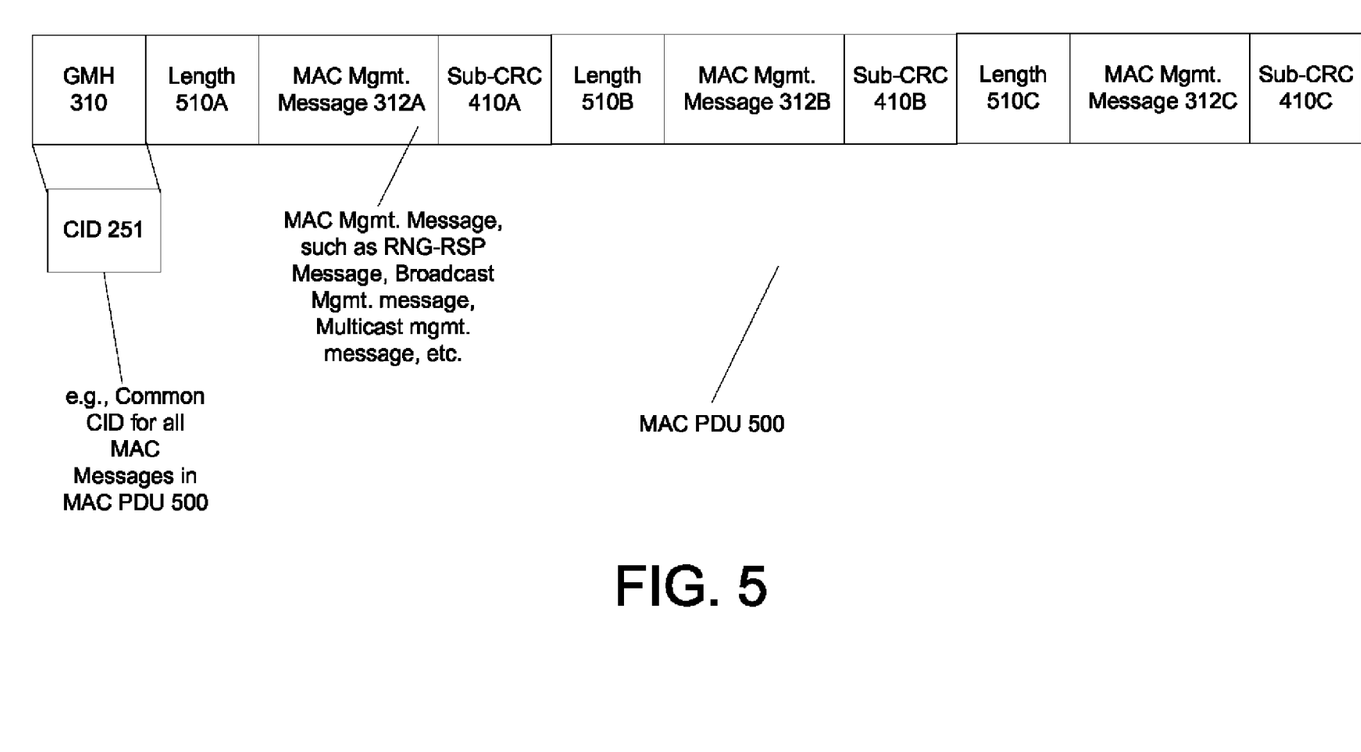
FIG. 5 is a diagram illustrating a format of yet another example MAC PDU having multiple MAC messages that are concatenated.

FIG. 5 is a diagram illustrating a format of yet another example MAC PDU having multiple MAC messages that are concatenated. MAC PDU 500 may be similar to MAC PDU 400 of FIG. 4, but MAC PDU 500 may include a length field 510 before each MAC management message 312, to identify the length of the MAC management message. For example, lengths fields 510A, 510B and 510C may indicate a length of MAC management messages 312A, 312B and 312C, respectively. In this case the sub-CRC is computed using the Length 510 and MAC management message 312.

Figure 6:
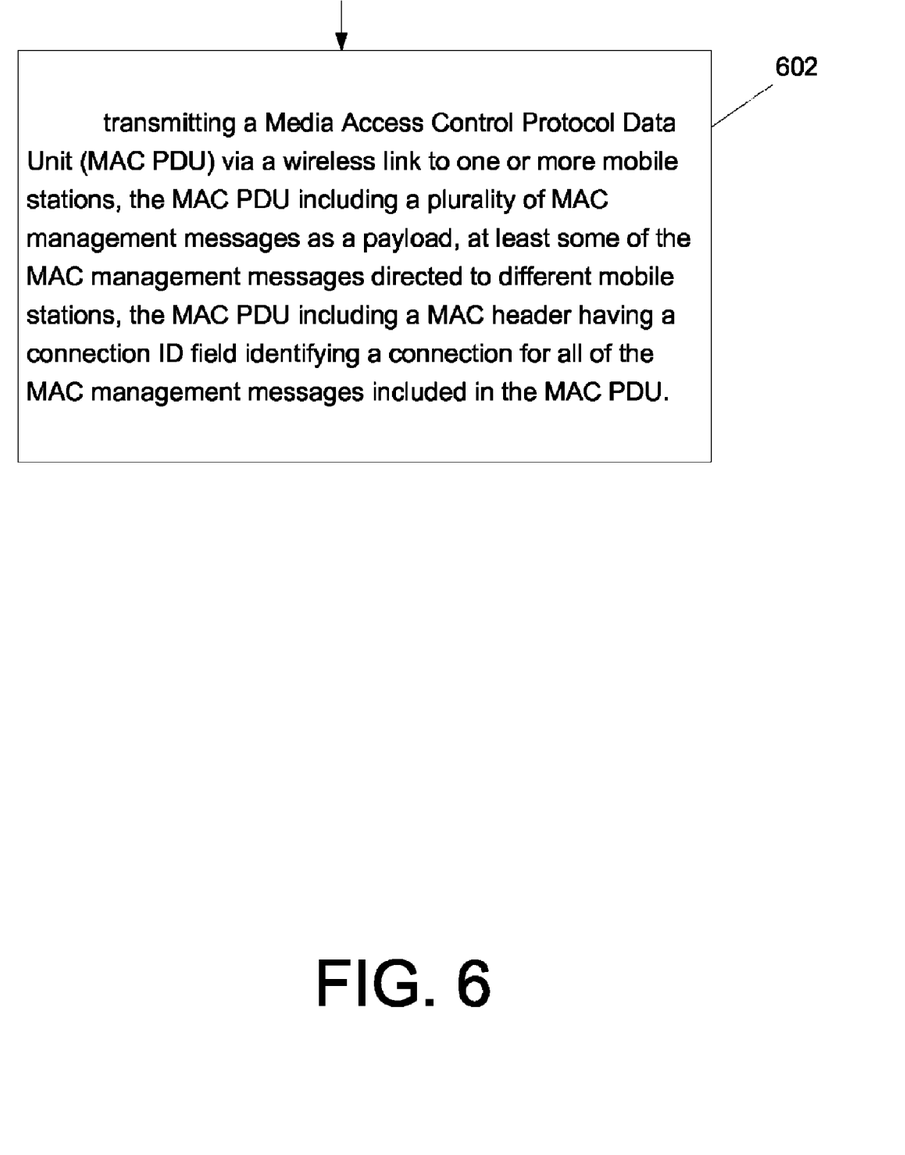
FIG. 6 is a flow chart illustrating operation of a wireless node (e.g., base station or other node) according to an example embodiment.

FIG. 6 is a flow chart illustrating operation of a wireless node (e.g., base station or other node) according to an example embodiment. Operation 602 may include transmitting a Media Access Control Protocol Data Unit (MAC PDU) via a wireless link to one or more mobile stations, the MAC PDU including a plurality of MAC management messages as a payload, at least some of the MAC management messages directed to different mobile stations, the MAC PDU including a MAC header having a connection ID field identifying a connection for all of the MAC management messages included in the MAC PDU. The flow chart of FIG. 6 may include one or more additional operations, according to various embodiments.

Referring to FIG. 6, in an example embodiment, the MAC PDU may further include a Cyclic Redundancy Check (CRC) to protect all of the MAC management messages in the MAC PDU. In another example embodiment, the MAC PDU may include a sub-CRC for each of the MAC management messages. In another example embodiment, the MAC header may include a length field indicating a length of the MAC PDU. In another example embodiment, the MAC header may include a length field indicating a length of at least one of the MAC management messages within the MAC PDU. In another example embodiment, the MAC PDU may include at least one type and length (TL) field indicating a type and length of at least one of the MAC management messages within the MAC PDU. In another example embodiment, the TL field may include only the type which indicates that another MAC management message follows. In another example embodiment, the TL field may indicate the CID for which the following MAC management message is dedicated, if multiple MAC management messages for different CIDs are concatenated; in this case the TL field is actually a type-value (TV) field. In another example embodiment, the MAC PDU may include a field that includes an authentication certificate (e.g., HMAC and/or CMAC) for the MAC PDU.

Also referring to FIG. 6, in another example embodiment, the transmitting (602) a Media Access Control Protocol Data Unit (MAC PDU) via a wireless link to one or more mobile stations may include transmitting a Media Access Control Protocol Data Unit (MAC PDU) including a plurality of Range Response (RNG-RSP) messages as a payload, the plurality of RNG-RSP messages including at least a first RNG-RSP message directed to a first mobile station and a second RNG-RSP message directed to a second mobile station, the MAC PDU including a Cyclic Redundancy Check (CRC) for the MAC PDU and a MAC header having a connection ID field indicating a common CID for the RNG-RSP messages included in the MAC PDU.

Referring to FIG. 6, the MAC PDU may include a Cyclic Redundancy Check (CRC) for the MAC PDU. In another example embodiment, the transmitting (602) a Media Access Control Protocol Data Unit (MAC PDU) via a wireless link to one or more mobile stations may include transmitting a Media Access Control Protocol Data Unit (MAC PDU) including a plurality of concatenated broadcast management messages associated with a broadcast connection ID, the MAC PDU including a MAC header having a connection ID field identifying the broadcast connection ID for the plurality of concatenated broadcast messages.

In another example embodiment, the transmitting (602) a Media Access Control Protocol Data Unit (MAC PDU) via a wireless link to one or more mobile stations may include transmitting a Media Access Control Protocol Data Unit (MAC PDU) including a plurality of concatenated multicast management messages, the MAC PDU including a MAC header having a connection ID field identifying a multicast connection ID for the plurality of concatenated multicast management messages.

A number of alternative embodiments for the flow chart of FIG. 6 will be briefly described. In an example embodiment, the MAC PDU may further include a Cyclic Redundancy Check (CRC) to protect all of the MAC management messages in the MAC PDU. The MAC PDU may further include a sub-CRC for each of the MAC management messages. In another example embodiment, the MAC header may further include a length field indicating a length of the MAC PDU. The MAC header may further include a length field indicating a length of at least one of the MAC management messages within the MAC PDU. In another example embodiment, the MAC PDU may further include at least one type and length field indicating a type and length of at least one of the MAC management messages within the MAC PDU. In another example embodiment, the MAC PDU may further include at least one type field indicating that another MAC management message within the MAC PDU follows. The MAC PDU may further include at least one type-value field indicating that other MAC management messages within the MAC PDU follow and they are assigned for the connection ID given by the value field. In another example embodiment, the MAC PDU may further include a field that includes an authentication certificate for the MAC PDU. The MAC PDU may include a Cyclic Redundancy Check (CRC) for the MAC PDU.

In another example embodiment, the transmitting (602) a Media Access Control Protocol Data Unit (MAC PDU) via a wireless link to one or more mobile stations may include transmitting a Media Access Control Protocol Data Unit (MAC PDU) including a plurality of Range Response (RNG-RSP) messages as a payload, the plurality of RNG-RSP messages including at least a first RNG-RSP message directed to a first mobile station and a second RNG-RSP message directed to a second mobile station, the MAC PDU including a Cyclic Redundancy Check (CRC) for the MAC PDU and a MAC header having a connection ID field indicating a common CID for the RNG-RSP messages included in the MAC PDU.

In another example embodiment, the transmitting (602) a Media Access Control Protocol Data Unit (MAC PDU) via a wireless link to one or more mobile stations may include transmitting a Media Access Control Protocol Data Unit (MAC PDU) including a plurality of concatenated broadcast management messages associated with a broadcast connection ID, the MAC PDU including a MAC header having a connection ID field identifying the broadcast connection ID for the plurality of concatenated broadcast messages.

In another example embodiment, the transmitting (602) a Media Access Control Protocol Data Unit (MAC PDU) via a wireless link to one or more mobile stations may include transmitting a Media Access Control Protocol Data Unit (MAC PDU) including a plurality of concatenated multicast management messages, the MAC PDU including a MAC header having a connection ID field identifying a multicast connection ID for the plurality of concatenated multicast management messages.

In another example embodiment, an apparatus may include a wireless interface, a controller. The controller may be configured to transmit (or generate for wireless transmission) a Media Access Control Protocol Data Unit (MAC PDU) via a wireless link to one or more mobile stations, the MAC PDU including a plurality of MAC management messages as a payload, at least some of the MAC management messages directed to different mobile stations, the MAC PDU including a MAC header having a connection ID field identifying a connection for all of the MAC management messages included in the MAC PDU.

Figure 7:
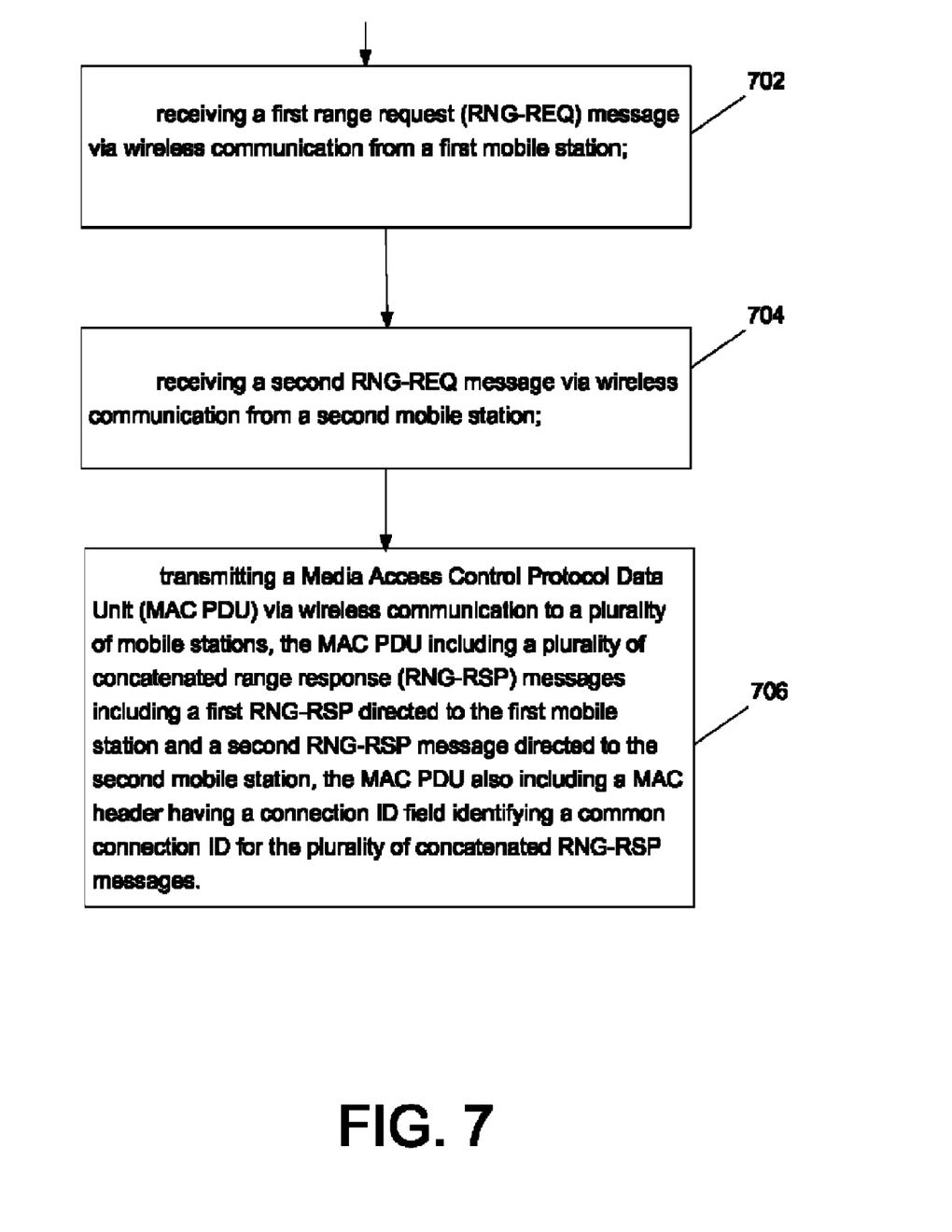
FIG. 7 is a flow chart illustrating operation of a wireless node (e.g., base station or other node) according to another example embodiment.

FIG. 7 is a flow chart illustrating operation of a wireless node (e.g., base station or other node) according to another example embodiment. Operation 702 may include receiving a first range request (RNG-REQ) message via wireless communication from a first mobile station. Operation 704 may include receiving a second RNG-REQ message via wireless communication from a second mobile station. Operation 706 may include transmitting a Media Access Control Protocol Data Unit (MAC PDU) via wireless communication to a plurality of mobile stations, the MAC PDU including a plurality of concatenated range response (RNG-RSP) messages including a first RNG-RSP directed to the first mobile station and a second RNG-RSP message directed to the second mobile station, the MAC PDU also including a MAC header having a connection ID field identifying a common connection ID for the plurality of concatenated RNG-RSP messages.

Referring to FIG. 7, in an example embodiment, the first RNG-REQ message may include a first Code Division Multiple Access (CDMA) code and the second RNG-REQ message may include a second CDMA code, and wherein the first RNG-RSP message may include the first CDMA code and the second RNG-RSP message includes the second CDMA code. (e.g., to allow an association or correspondence between RNG-REQ messages and RNG-RSP messages). In another example embodiment, the connection ID field may be a value (e.g., CID=0) indicating RNG-RSP for all of the concatenated RNG-RSP messages. In another example embodiment, the MAC header may include a length field indicating a length of the MAC PDU. In another example embodiment, the MAC header may include a length field indicating a length of at least one of the MAC management messages within the MAC PDU. In another example embodiment, the MAC PDU may include at least one type and length field indicating a type and length of at least one of the MAC management messages within the MAC PDU. In another example embodiment, the MAC PDU may include at least one type field indicating that a new MAC management message follows within the MAC PDU. In another example embodiment, the MAC PDU may include a field that includes an authentication certificate for the MAC PDU.

In an example embodiment of the flow chart of FIG. 7, the first RNG-REQ message includes a first Code Division Multiple Access (CDMA) code and the second RNG-REQ message includes a second CDMA code, and wherein the first RNG-RSP message includes the first CDMA code and the second RNG-RSP message includes the second CDMA code.

In an example embodiment of the flow chart of FIG. 7, the connection ID field may be a value indicating RNG-RSP for all of the concatenated RNG-RSP messages. In an example embodiment of the flow chart of FIG. 7, the MAC header may further include a length field indicating a length of the MAC PDU. In an example embodiment of the flow chart of FIG. 7, the MAC header may further include a length field indicating a length of at least one of the MAC management messages within the MAC PDU.

In an example embodiment of the flow chart of FIG. 7, the MAC PDU may further include at least one type and length field indicating a type and length of at least one of the MAC management messages within the MAC PDU. In an example embodiment of the flow chart of FIG. 7, the MAC PDU may further include at least one type field indicating that another MAC management message within the MAC PDU follows. In an example embodiment of the flow chart of FIG. 7, the MAC PDU may further include a field that includes an authentication certificate for the MAC PDU.

In another example embodiment, an apparatus may include a wireless interface, a controller. The controller may be configured to: receive a first range request (RNG-REQ) message via wireless communication from a first mobile station; receive a second RNG-REQ message via wireless communication from a second mobile station; and transmit (or generate for wireless transmission) a Media Access Control Protocol Data Unit (MAC PDU) via wireless communication to a plurality of mobile stations, the MAC PDU including a plurality of concatenated range response (RNG-RSP) messages including a first RNG-RSP directed to the first mobile station and a second RNG-RSP message directed to the second mobile station, the MAC PDU also including a MAC header having a connection ID field identifying a common connection ID for the plurality of concatenated RNG-RSP messages.

Several alternative embodiments regarding the apparatus will be briefly described. In an example embodiment, the first RNG-REQ message may include a first Code Division Multiple Access (CDMA) code and the second RNG-REQ message includes a second CDMA code, and wherein the first RNG-RSP message includes the first CDMA code and the second RNG-RSP message includes the second CDMA code. In another example embodiment, the connection ID indicates RNG-RSP for all of the concatenated RNG-RSP messages.

In another example embodiment, the MAC PDU may further include a sub-CRC for one or more of the RNG-RSP messages. In another example embodiment, the MAC header further includes a length field indicating a length of the MAC PDU. In another example embodiment, the MAC header may further include a field associated with at least one of the RNG-RSP message and indicating a length of the at least one RNG-RSP messages within the MAC PDU. In another example embodiment, the MAC PDU further includes at least one type and length field indicating a type and length of at least one of the RNG-RSP message within the MAC PDU. In another example embodiment, the MAC PDU further includes at least one type field indicating that another RNG-RSP message within the MAC PDU follows. In another example embodiment, MAC PDU further includes a field that includes an authentication certificate for the MAC PDU.

Figure 8:
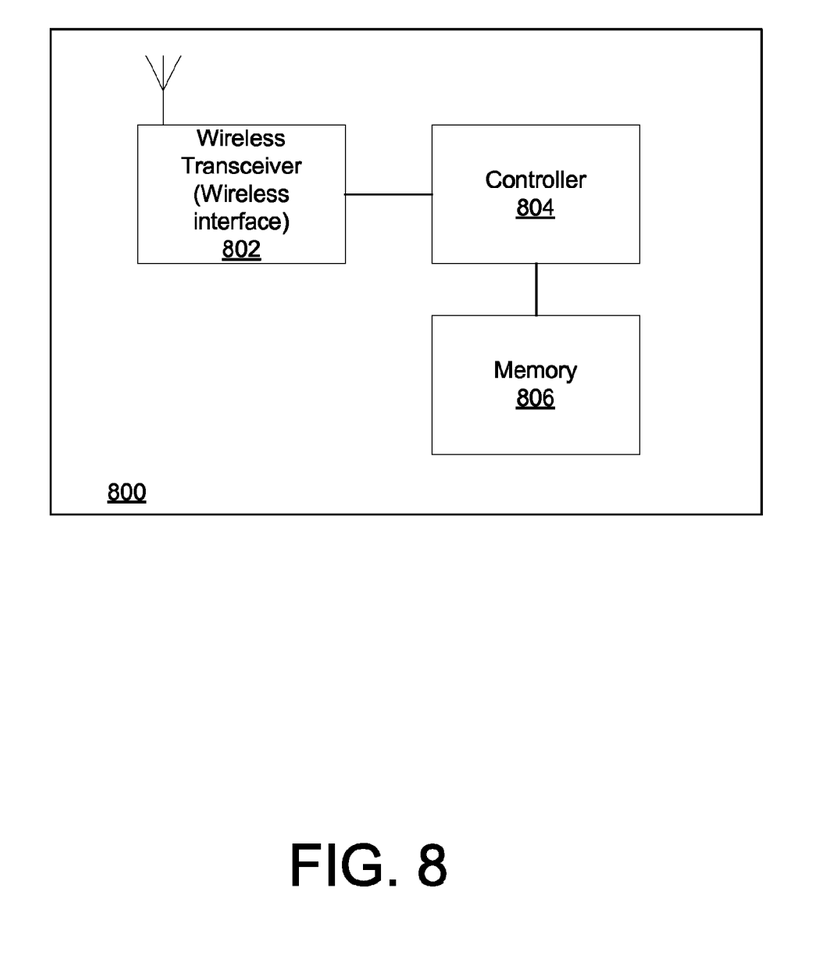
FIG. 8 is a block diagram of a wireless node (e.g., mobile station or base station) according to an example embodiment.

FIG. 8 is a block diagram of a wireless station (or wireless node) 800 according to an example embodiment. The wireless station 800 (e.g. base station 104 or mobile node 106, 108, 110) may include, for example, a wireless transceiver (or wireless interface) 802 to transmit and receive signals, a controller 804 to control operation of the station and execute instructions or software, and a memory 806 to store data and/or instructions. For example, controller (or processor) 804 may transmit messages or information via wireless transceiver 802, for example, or may generate messages for transmission. Controller (or processor) 804 may control the operation of wireless transceiver 802.

Controller 804 may be programmable and capable of executing software or other instructions stored in memory or on other computer media to perform the various tasks and functions described above, such as one or more of the tasks or methods described above.

In addition, a storage medium may be provided that includes stored instructions, which when executed by a controller or processor may result in the controller 804, or other controller or processor, performing one or more of the functions or tasks described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
transmitting a Media Access Control Protocol Data Unit (MAC PDU) via a wireless link to one or more mobile stations, the MAC PDU including a plurality of MAC management messages as a payload, at least some of the MAC management messages directed to different mobile stations, the MAC PDU including a MAC header having a connection ID field identifying a connection for at least the first MAC management message included in the MAC PDU.

2. The method of claim 1 wherein the MAC PDU further includes a Cyclic Redundancy Check (CRC) to protect all of the MAC management messages in the MAC PDU.

3. The method of claim 1 wherein the MAC PDU further includes a sub-CRC for each of the MAC management messages.

4. The method of claim 1 wherein the MAC header further includes a length field indicating a length of the MAC PDU.

5. The method of claim 1 wherein the MAC header further includes a length field indicating a length of at least one of the MAC management messages within the MAC PDU.

6. The method of claim 1 wherein the MAC PDU further includes at least one type and length field indicating a type and length of at least one of the MAC management messages within the MAC PDU.

7. The method of claim 1 wherein the MAC PDU further includes at least one type field indicating that another MAC management message within the MAC PDU follows.

8. The method of claim 1 wherein the MAC PDU further includes at least one type-value field indicating that other MAC management messages within the MAC PDU follow and they are assigned for the connection ID given by the value field.

9. The method of claim 1 wherein the MAC PDU further includes a field that includes an authentication certificate for the MAC PDU.

10. The method of claim 1 wherein the transmitting a Media Access Control Protocol Data Unit (MAC PDU) via a wireless link to one or more mobile stations comprises transmitting a Media Access Control Protocol Data Unit (MAC PDU) including a plurality of Range Response (RNG-RSP) messages as a payload, the plurality of RNG-RSP messages including at least a first RNG-RSP message directed to a first mobile station and a second RNG-RSP message directed to a second mobile station, the MAC PDU including a Cyclic Redundancy Check (CRC) for the MAC PDU and a MAC header having, a connection ID field indicating, a common CID for the RNG-RSP messages included in the MAC PDU.

11. The method of claim 10 wherein the MAC PDU includes a Cyclic Redundancy Check (CRC) for the MAC PDU.

12. The method of claim 1 wherein the transmitting a Media Access Control Protocol Data Unit (MAC PDU) via a wireless link to one or more mobile stations comprises transmitting a Media Access Control Protocol Data Unit (MAC PDU) including a plurality of concatenated broadcast management messages associated with a broadcast connection ID, the MAC PDU including a MAC header having a connection ID field identifying the broadcast connection ID for the plurality of concatenated broadcast messages.

13. The method of claim 1 wherein the transmitting a Media Access Control Protocol Data Unit (MAC PDU) via a wireless link to one or more mobile stations comprises transmitting a Media Access Control Protocol Data Unit (MAC PDU) including a plurality of concatenated multi cast management messages, the MAC PDU including a MAC header having a connection ID field identifying a multicast connection ID for the plurality of concatenated multicast management messages.

14. A method comprising:
receiving a first range request (RNG-REQ) message via wireless communication from a first mobile station;
receiving a second RNG-REQ message via wireless communication from a second mobile station;
transmitting a Media Access Control Protocol Data Unit (MAC PDU) via wireless communication to a plurality of mobile stations, the MAC PDU including a plurality of concatenated range response (RNG-RSP) messages including a first RNG-RSP directed to the first mobile station and a second RNG-RSP message directed to the second mobile station, the MAC PDU also including a MAC header having a connection ID field identifying a common connection ID for the plurality of concatenated RNG-RSP messages.

15. The method of claim 14 wherein the first RNG-REQ message includes a first Code Division Multiple Access (CDMA) code and the second RNG-REQ message includes a second CDMA code, and wherein the first RNG-RSP message includes the first CDMA code and the second RNG-RSP message includes the second CDMA code.

16. The method of claim 14 wherein the connection ID field is a value indicating RNG-RSP for all of the concatenated RNG-RSP messages.

17. The method a claim 14 wherein the MAC header further includes a length field indicating a length of the MAC PDU.

18. The method of claim 14 wherein the MAC header further includes a length field indicating a length of at least one of the MAC management messages within the MAC PDU.

19. The method of claim 1 wherein the MAC PDU further includes at least one type and length field indicating a type and length of at least one of the MAC management messages within the MAC PDU.

20. The method of claim 1 wherein the MAC PDU further includes at least one type field indicating that another MAC management message within the MAC PDU follows.

21. The method of claim 1 wherein the MAC PDU further includes a field that includes an authentication certificate for the MAC PDU.

22. An apparatus comprising:
a wireless interface; and
a controller, the apparatus being configured to:
receive a first range request (RNG-REQ) message via wireless communication from a first mobile station;
receive a second RNG-REQ message via wireless communication from a second mobile station; and
transmit a Media Access Control Protocol Data Unit (MAC PDU) via wireless communication to a plurality of mobile stations, the MAC PDU including a plurality of concatenated range response (RNG-RSP) messages including a first RNG-RSP directed to the first mobile station and a second RNG-RSP message directed to the second mobile station, the MAC PDU also including a MAC header having a connection ID field identifying a common connection ID for the plurality of concatenated RNG-RSP messages.

23. The apparatus of claim 22 wherein the first RNG-REQ message includes a first Code Division Multiple Access (CDMA) code and the second RNG-REQ message includes a second CDMA code, and wherein the first RNG-RSP message includes the first CDMA code and the second RNG-RSP message includes the second CDMA code.

24. The apparatus of claim 22 wherein the connection ID indicates RNG-RSP for all of the concatenated RNG-RSP messages.

25. The apparatus of claim 22 wherein the MAC PDU further includes a sub-CRC for one or more of the RNG-RSP messages.

26. The apparatus of claim 22 wherein the MAC header further includes a length field indicating a length of the MAC PDU.

27. The apparatus of claim 22 wherein the MAC header further includes a field associated with at least one of the RNG-RSP message and indicating a length of the at least one RNG-RSP messages within the MAC PDU.

28. The apparatus of claim 22 wherein the MAC PDU further includes at least one type and length field indicating a type and length of at least one of the RNG-RSP message within the MAC PDU.

29. The apparatus of claim 22 wherein the MAC PDU further includes at least one type field indicating that another RNG-RSP message within the MAC PDU follows.

30. The apparatus of claim 22 wherein the MAC PDU further includes field that includes an authentication certificate for the MAC PDU.

31. An apparatus comprising:
a wireless interface and
a controller, the apparatus being configured to:
transmit a Media Access Control Protocol Data Unit (MAC PDU) via a wireless link to one or more mobile stations, the MAC PDU including a plurality of MAC management messages as a payload, at least some of the MAC management messages directed to different mobile stations, the MAC PDU including a MAC header having a connection ID field identifying a connection for all of the MAC management messages included in the MAC PDU.

* * * * *